(12) United States Patent
Sayers et al.

(10) Patent No.: US 7,015,809 B1
(45) Date of Patent: Mar. 21, 2006

(54) METHOD AND SYSTEM FOR PROVIDING AN ACTIVE ROUTING ANTENNA

(75) Inventors: Ian Sayers, Redwood City, CA (US); Jan Long, San Francisco, CA (US)

(73) Assignee: Skipper Wireless Inc., Tokyo (JP)

( * ) Notice: Subject to any disclaimer, the term of this patent is extended or adjusted under 35 U.S.C. 154(b) by 100 days.

(21) Appl. No.: 10/631,494

(22) Filed: Jul. 31, 2003

Related U.S. Application Data

(60) Provisional application No. 60/403,786, filed on Aug. 14, 2002.

(51) Int. Cl.
*G08B 1/08* (2006.01)

(52) U.S. Cl. .............................. 340/539.1; 340/572.7; 455/562.1

(58) Field of Classification Search ............. 340/539.1, 340/539.21, 286.01, 286.02; 455/84, 25, 455/562.1; 342/354, 373, 374; 375/224, 375/295, 347
See application file for complete search history.

(56) References Cited

U.S. PATENT DOCUMENTS

| | | | |
|---|---|---|---|
| 4,835,463 A | 5/1989 | Baran et al. ............. 324/123 R |
| 4,939,726 A | 7/1990 | Flammer et al. ............ 370/400 |
| 5,007,052 A | 4/1991 | Flammer ..................... 370/389 |
| 5,079,768 A | 1/1992 | Flammer ..................... 370/349 |
| 5,115,433 A | 5/1992 | Baran et al. ................. 370/400 |
| 5,130,987 A | 7/1992 | Flammer ..................... 370/436 |
| 5,223,790 A | 6/1993 | Baran et al. ................. 324/127 |
| 5,243,536 A | 9/1993 | Bradford ...................... 702/60 |
| 5,338,332 A | 8/1994 | Baran et al. ................... 75/247 |
| 5,400,338 A | 3/1995 | Flammer, III ............... 370/255 |
| 5,406,249 A | 4/1995 | Pettus ................... 340/310.06 |
| 5,412,654 A | 5/1995 | Perkins ....................... 370/312 |
| 5,453,977 A | 9/1995 | Flammer, III, et al. ...... 370/254 |
| 5,465,398 A | 11/1995 | Flammer ...................... 455/69 |
| 5,471,469 A | 11/1995 | Flammer, III et al. ....... 370/346 |
| 5,479,176 A | 12/1995 | Zavrel, Jr. ................... 342/374 |
| 5,479,400 A | 12/1995 | Dilworth et al. ............ 370/331 |
| 5,485,393 A | 1/1996 | Bradford ...................... 702/60 |
| 5,488,608 A | 1/1996 | Flammer, III ............... 370/400 |
| 5,515,369 A | 5/1996 | Flammer, III et al. ....... 370/480 |
| 5,570,084 A | 10/1996 | Ritter et al. ................. 370/338 |
| 5,636,216 A | 6/1997 | Fox et al. .................... 370/402 |
| 5,664,194 A | 9/1997 | Paulsen ...................... 717/178 |
| 5,703,602 A | 12/1997 | Casebolt ..................... 343/702 |
| 5,736,959 A * | 4/1998 | Patterson et al. ........... 342/354 |
| 5,745,483 A | 4/1998 | Nakagawa et al. ......... 370/335 |
| 5,774,344 A | 6/1998 | Casebolt ..................... 361/800 |
| 5,787,077 A | 7/1998 | Kuehnel et al. | |
| 5,793,842 A | 8/1998 | Schloemer et al. | |
| 5,818,828 A | 10/1998 | Packer et al. ............... 370/346 |
| 5,901,143 A | 5/1999 | Rotter et al. | |
| 5,903,566 A | 5/1999 | Flammer, III ............... 370/406 |
| 5,946,615 A | 8/1999 | Holmes et al. ........... 455/412.1 |

(Continued)

FOREIGN PATENT DOCUMENTS

WO    WO 95/28780 A1    10/1995

(Continued)

*Primary Examiner*—Van T. Trieu
(74) *Attorney, Agent, or Firm*—McDermott Will & Emery LLP

(57) ABSTRACT

An array antenna is disclosed. In one embodiment, the array antenna facilitates transmission of data with amongst fixed radio units. The array antenna includes a number of antenna panels arranged in an hexagonal shape, one or more array control elements controlling the antenna panels, and one antenna routing element controlling the one or more array control elements.

39 Claims, 8 Drawing Sheets

U.S. PATENT DOCUMENTS

| | | | |
|---|---|---|---|
| 6,026,303 A | 2/2000 | Minamisawa | 455/446 |
| 6,028,853 A | 2/2000 | Haartsen | 370/338 |
| 6,041,232 A | 3/2000 | Jennings, III | 455/422.1 |
| 6,049,593 A | 4/2000 | Acampora | 379/56.2 |
| 6,072,994 A * | 6/2000 | Phillips et al. | 455/84 |
| 6,104,712 A | 8/2000 | Robert et al. | 370/389 |
| 6,173,191 B1 | 1/2001 | Jennings, III | 455/562.1 |
| 6,192,230 B1 | 2/2001 | van Bokhorst et al. | 455/343.3 |
| 6,198,728 B1 | 3/2001 | Hulyalkar et al. | |
| 6,298,053 B1 | 10/2001 | Flammer, III et al. | 370/349 |
| 6,304,556 B1 | 10/2001 | Haas | 370/254 |
| 6,307,843 B1 | 10/2001 | Okanoue | 370/312 |
| 6,314,163 B1 | 11/2001 | Acampora | 379/56.2 |
| 6,327,918 B1 | 12/2001 | Lawless | 73/863.2 |
| 6,329,902 B1 | 12/2001 | Lee et al. | 370/7.27 |
| 6,330,438 B1 | 12/2001 | McClelland et al. | |
| 6,349,206 B1 | 2/2002 | Reichelt et al. | |
| 6,456,675 B1 * | 9/2002 | Wagner et al. | 375/347 |
| 6,728,554 B1 * | 4/2004 | Wegner | 455/562.1 |
| 6,801,790 B1 * | 10/2004 | Rudrapatna | 455/562.1 |
| 6,816,706 B1 * | 11/2004 | Hohnstein et al. | 455/25 |
| 2001/0002908 A1 | 6/2001 | Rune et al. | |
| 2001/0003191 A1 | 6/2001 | Kovacs et al. | |
| 2001/0005368 A1 | 6/2001 | Rune | |
| 2001/0012757 A1 | 8/2001 | Boyle | |
| 2001/0013856 A1 | 8/2001 | Hamakada et al. | |
| 2001/0016909 A1 | 8/2001 | Gehrmann | |
| 2001/0018336 A1 | 8/2001 | Okajima et al. | |
| 2001/0022780 A1 | 9/2001 | Mizutani et al. | |
| 2001/0024443 A1 | 9/2001 | Alriksson et al. | |
| 2001/0029166 A1 | 10/2001 | Rune et al. | |
| 2001/0031626 A1 | 10/2001 | Lindskog et al. | |
| 2001/0033248 A1 | 10/2001 | Owechko | |
| 2001/0033556 A1 | 10/2001 | Krishnamurthy et al. | |
| 2001/0045914 A1 | 11/2001 | Bunker | |
| 2002/0004817 A1 | 1/2002 | Pham et al. | |
| 2002/0016838 A1 | 2/2002 | Geluc et al. | |
| 2002/0018448 A1 | 2/2002 | Amis et al. | |

FOREIGN PATENT DOCUMENTS

| | | |
|---|---|---|
| WO | WO 96/00468 AI | 1/1996 |
| WO | WO 97/09673 A1 | 3/1997 |
| WO | WO 01/86850 A1 | 11/2001 |
| WO | WO 02/19740 A1 | 3/2002 |

* cited by examiner

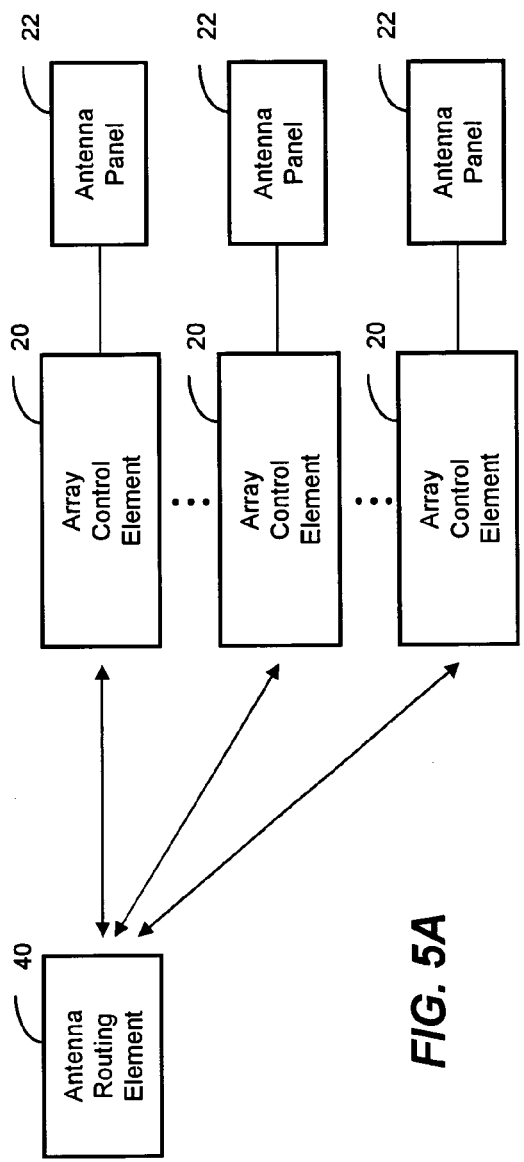
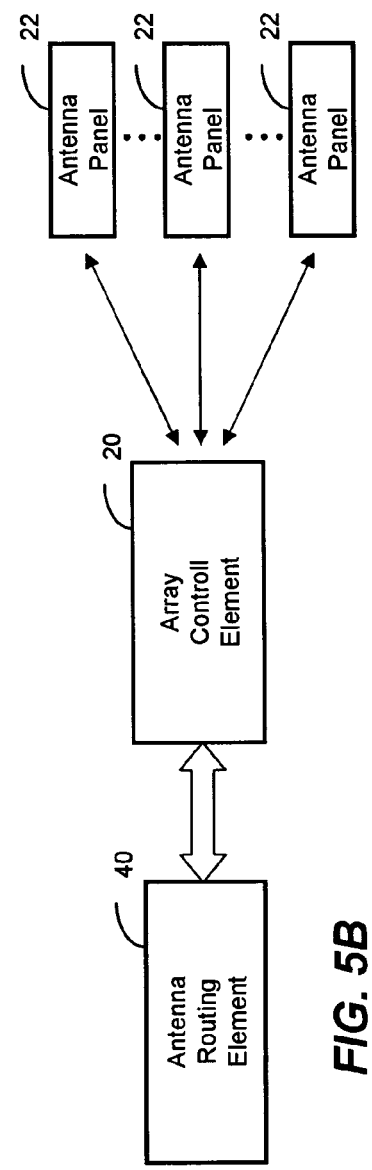
FIG. 5A
FIG. 5B

| Angle (Degree) | Gain (dB) |
| --- | --- |
| 0 | 13.99089 |
| 5 | 13.80725 |
| 10 | 13.6864 |
| 15 | 13.36147 |
| 20 | 12.96956 |
| 25 | 12.23072 |
| 30 | 11.56005 |
| 35 | 10.58249 |
| 40 | 9.69786 |
| 45 | 8.76228 |
| 50 | 7.77071 |
| 55 | 7.03775 |
| 60 | 6.2154 |
| 65 | 5.05291 |
| 70 | 3.96071 |
| 75 | 2.39613 |
| ... | ... |
| 275 | -5.33051 |
| 280 | -2.85197 |
| 285 | -0.87944 |
| 290 | 0.78666 |
| 295 | 2.80328 |
| 300 | 4.18679 |
| 305 | 5.71032 |
| 310 | 7.09885 |
| 315 | 8.51038 |
| 320 | 9.85752 |
| 325 | 11.06043 |
| 330 | 11.90156 |
| 335 | 12.53416 |
| 340 | 13.04168 |
| 345 | 13.48098 |
| 350 | 13.86416 |
| 355 | 14.1225 |

*FIG. 7*

| Antenna Panel Number | Received Signal Strength |
|---|---|
| 1 | a |
| 2 | b |
| 3 | c |
| 4 | d |
| 5 | e |
| 6 | f |

METHOD AND SYSTEM FOR PROVIDING AN ACTIVE ROUTING ANTENNA

CROSS-REFERENCES TO RELATED APPLICATION(S)

The present application claims the benefit of priority under 35 U.S.C. § 119 from U.S. Provisional patent application Ser. No. 60/403,786 entitled "SYSTEM FOR MOBILE BROADBAND NETWORKING USING DYNAMIC QUALITY OF SERVICE PROVISIONING", filed on Aug. 14, 2002, the disclosure of which is hereby incorporated by reference in its entirety for all purposes.

BACKGROUND OF THE INVENTION

The present invention relates in general to network communications and, more specifically, to a method and system for providing an active routing antenna for use in conjunction with fixed and mobile wireless transceivers with dynamic routing based on quality-of-service (QoS) criteria in order to optimize data transfers in a network with dynamically changing topology.

Wireless networks are gaining in popularity. Standards such as IEEE 802.11a, 802.11b, 802.11 g, Bluetooth, Ultra Wideband (UWB), etc., allow users to connect wirelessly via portions of the radio-frequency spectrum. As the cost of wireless network systems decreases and their popularity increases, these systems are becoming more prevalent. Some provide channels for relatively unrestricted transfer of information among various devices. The devices can be owned or operated by different users without formal licensing registration, certification, administrator approval or other access restrictions. In cases where mobile wireless transceivers are used, there can be a constant change in the number and type of devices accessing a wireless network.

The types of wireless systems available today have shortcomings for some applications. The IEEE 802.11a, 802.11b and 802.11 g standard systems have two modes of operation: infrastructure and Ad-Hoc. The infrastructure mode uses a dedicated radio controller and is primarily designed to provide a direct wireless link to a standard Ethernet network connection. The "Ad Hoc" approach allows for peer-to-peer networking, so that a very small network of several PCs on the same wireless channel can share files. The nodes in this network control their own access to the wireless media. The Ad Hoc mode is primarily used to temporarily interconnect a few computers together where an Ethernet backbone may not be available or an emergency network is required. There is no means of gaining access to the corporate Ethernet network or an Internet connection. As such, neither scheme is designed for "multi-hop" transmission. In a "multi-hop" scheme, data is transferred to intermediary wireless transceivers before arriving at a final target receiving device.

Generally, the quality of a communications channel in a wireless network is not guaranteed so that, for example, a software process executing on a device is not guaranteed a specific transfer rate over any given interval of time. This makes it very difficult to provide, e.g., streaming media such as video and audio.

Other approaches to wireless communications do not provide a comprehensive system design approach. For example, UWB only defines a radio physical layer. This merely defines how bits will be transmitted on the radio interface physical connection. There is no definition for a flexible protocol to allow coordination of devices, channels, links, etc., within a UWB wireless network. Bluetooth does include several features for point-to-point communications between devices, but does this based on a master-slave relationship that is difficult to use in a network with changing topology, such as one made up of mobile wireless transceivers. In addition, all the nodes within the Bluetooth network must be able to communicate at least with the master for coordination purposes. This clearly limits the operational range of the network.

Other considerations for a flexible wireless communication system include scalability, range, coverage, user interface presentation and options, network management, minimization of radio interference, compliance with applicable regulations, creation of user features to generate market desirability, security and access controls, physical design, features and operation of the devices, etc.

Furthermore, wireless communications are typically implemented using radio frequency (RF). Typically, a radio network is made up of a number of base transmitting stations (BTSs), each connected to a wired network. Each BTS provides a region of RF coverage (also called cells) for users of the network. The radio frequencies used by the BTSs may be in a licensed or ISM band. Devices then communicate with the wired network using the radio frequency associated with a BTS. Adjoining BTSs may use different frequencies to improve use of the radio resources.

The radio network as described above suffers from a number of shortcomings. These shortcomings include, for example, link inefficiency, security problems, roaming issues and network deployment issues.

With respect to link inefficiency, most of the current radio technologies rely on a Media Access Control (MAC) layer to provide shared access to the radio media. However, the current MAC layers are designed to deal with a single point-to-point link, that is, one mobile user/terminal device in communication with one BTS radio link. This leads to a number of problems in the design of the MAC layer. For example, the MAC layer is not designed to coordinate transmissions from multiple BTSs, or peer nodes, but only terminal devices. The MAC layer also does not generally provide any quality of service functions, since it is not required to by the nature of the communication link. In addition, in some networks, the MAC layer must sense the radio media before transmission, which means that the best link may not be utilized.

With respect to network security, the radio network is inherently a shared medium. Hence, anyone equipped with suitable receiver equipment can eavesdrop on the network. Many attempts have been made to prevent eavesdropping, for example, by encrypting the radio link based on some shared key or other algorithm. In public cellular systems, the keys are usually generated and stored in a central database, which can lead to security problems with respect to access. Other techniques that have been used include end-to-end encryption using IPSec or secure shells. However, these techniques require software to run above the radio connection and must also be run by the user prior to any communication between the user and the network.

With respect to roaming, handover techniques could be used in a radio network to allow the user to roam within the bounds of the network. However, the problem remains that as the user moves from one BTS to another, the point of attachment to the network changes. In an IP network, this may mean that the subnet that the user is originally registered on may change thereby leading to loss of connection. Existing solutions to this problem mainly rely on the use of mobile IP and its variants. These solutions remain unsatisfactory in that as the user moves around more and more, nodes in the network may become tied up with carrying traffic that is merely transiting the node and not terminating the IP traffic, thereby leading to very inefficient use of network resources. Some such solutions may attempt to clear up the network trails but may also provide disruption problems for real time traffic.

With respect to network deployment, in order to provide radio network coverage, it is generally necessary for the operator of the network to install BTSs in areas to provide coverage and then to link these BTSs back to the main network. This can be an expensive and time-consuming process. Furthermore, the positioning of the BTSs is generally dictated by physical constraints of the locale and may be suboptimal.

An alternative to the Fixed BTS-Mobile Terminal network architecture is an "Ad Hoc" wireless network. In this type of network, many or all the nodes of the network could be in motion. Consequently, it is difficult to know the relative location of the two wireless nodes that may wish to communicate. Hence, it is also difficult to determine a "best path" to the destination or recipient node without generally flooding the network with route requests the essentially search every possible path for a route to the destination. The foregoing method of establishing links between two wireless nodes is very inefficient, wasting a large amount of bandwidth in the process. In addition, the foregoing method also limits the number of nodes that could be supported. In effect, the network becomes self-limiting because of the lack of node location information.

In order to improve the performance of an ad hoc network, it is possible to provide location information to various wireless nodes using, for example, the Global Positioning System (GPS). Use of GPS, however, is generally quite expensive in terms of product cost and power drain on each node. In addition, GPS has certain coverage limitations which prevent it from being used in some physical locations, such as, inside a building structure.

Hence, it would be desirable to provide a wireless network with dynamically changing topology that is capable of accommodating and handling heterogeneous user traffic from multiple devices in a more efficient manner.

BRIEF SUMMARY OF THE INVENTION

The method and system of the present invention allows multiple wireless transceivers to flexibly communicate in a managed and optimized manner in a network that has a dynamic topology. In a preferred embodiment, two types of transceivers are used. One is a mobile radio unit (MRU or "mobile unit") and one is a semi-fixed, or fixed radio unit (FRU or "fixed unit"). The mobile unit could be a handheld or portable computing device equipped with radio-frequency (RF) send and receive capability. In one embodiment, the fixed unit is a larger processing system, such as a personal computer, server, etc., that typically includes a more powerful radio transceiver and, therefore, longer range RF transmission capabilities.

The mobile units are equipped to present consumer-oriented features such as music (or other audio) playback and recording, address book, calendar, data storage and transfer, etc. Other features can include digital telephone, local, downloaded or streamed video playback, etc. Contents from a mobile unit can be made available without the need to synchronize information stored on the mobile unit with a stored database in a fixed unit or another mobile unit or vice-versa. Various aspects of the hardware, software and physical design of the mobile units are further described below.

In a preferred embodiment of the present invention, fixed units are envisioned to reside in a home with one or more mobile units registered to a specific fixed unit. Both fixed and mobile units can communicate with each other over short or longer range radio channels. The units transfer data or communicate over one or more "hops," where a "hop" allows a communication between two units whether fixed or mobile, in which a first unit communicates with a second unit that is outside of the range of the first unit but communication is achieved through transfer of data through intermediary units so that the data can ultimately be relayed through the intermediary units to the second unit. "Hopping" refers also to dynamically changing one or more intermediary units to add, delete, change or modify the intermediate relay points.

Since the majority of the units in the network are mobile, the unique procedures elaborated in the present invention are able to perform routing in a wireless network environment or topology which is continuously changing. This means that data is transferred between fixed or mobile units by "hopping" between dynamically changing intermediate units. Importantly, the fixed units may act as intermediate units under the "hopping" method of the present invention. The best path between a sending and receiving unit can change from transmission to transmission, or even within a single transmission, as the underlying topology of the network changes, mobile units are moved or their availability changes for other reasons.

One feature of the wireless system of the present invention is a routing process that tracks unit locations and inter-unit channel conditions. The routing process uses characteristics of the channels between two or more units, such as but not limited to, the data rate, reliability, number of unit hops, load, congestion, requested Quality of Service (QoS), etc. Additional factors can be used in routing evaluation, such as, desired QoS to be provided to a user, device or process. For example, where a user is using a voice feature of a device, the routing process attempts to ensure at least a minimum data rate or time delay with no dropouts to make sure the voice quality is maintained. This feature has a higher level of service than, for example, downloading a file since a pause in file downloading does not have as critical an effect on the user. One advantage of the present invention is the capability to determine the required level of service based upon the feature requested by the user of the network. Therefore, the user does not have to be concerned about the network conditions, whereas, in other networks, the user may have to stop the conversation or take other actions until the radio conditions improve.

Other aspects of the routing process include registration or detection of transceiver location. Where fixed units are installed in homes, the user can manually describe the location so that, for example, latitude and longitude coordinates could be derived. A built-in GPS receiver could also perform the same task. Another approach is to triangulate transceiver location by using the known or derived locations of other transceivers. Data about various characteristics of units that is useful for routing purposes is maintained in tables (or other forms of storage) in various units, in a central location or both. As units are brought into, taken from, or moved within the network, the routing process (or processes) attempts to maintain desired levels of service.

One feature of the RF transmitters used in the present invention is the use of antenna arrays for directional transmission. This allows transmitters so-equipped to "steer" a radio beam to specific receivers so that greater distance with less power is achieved. The receiving ability of such antennas is also directional so that receiver sensitivity to specific units at known locations can be increased. Further, this approach reduces the interference from potentially competing signals. This, in turn, increases network efficiency and can, therefore, enhance network density and performance.

Units can be connected to other wireless or wired networks, such as but not limited to, the Internet, corporate or campus intranets, home networks, etc. Services, such as, streaming of media can be provided within a household or to other designated recipients. Security and access controls are provided. One aspect of the system allows units to relay information without storing the information in order to comply with typical media licenses or copyrights. The system provides flexible permission granting, control and other features to manage use of media, objects or other data.

Generally, all the data can be relayed securely without the ability to interpret data that is in transit through a node or nodes. The system allows for end-to-end encryption to protect traffic being routed along the communication route. Alternatively, some portions or links of the communication route are protected with encryption while other portions are not, and different portions of the communication route can be protected using different encryption codes or technologies. This is advantageous for a number of reasons. For example, in order to comply with certain country specific regulatory or other issues, it may be necessary to terminate the secure link at one or more intermediary nodes and then forward the traffic using a different encryption code or in clear text; in another instance, it may also be required to re-encrypt the already encrypted channel with another encryption code.

Other aspects of the present invention include user interfaces of the units, scalability of the network, etc.

In one embodiment, the FRU includes an array antenna that facilitates transmission of data with other FRUs. The array antenna includes a number of antenna panels arranged in an hexagonal shape, one or more array control elements controlling the antenna panels, and one antenna routing element controlling the one or more array control elements.

Furthermore, according to a method of the present invention, a receiving FRU is able to determine the direction of a transmitting FRU or node using an antenna array having a number of panels. Each panel is configured to receive signals. According to one aspect of the method, a gain table is constructed for each of the panels, the gain table having a number of gain values corresponding to a number of angles. Each of the panels may be directed to receive signals from a different transmitting node or nodes. For each panel, a first table having data representing received signal power difference between the panel and a first neighboring panel and a second table having data representing received signal power difference between the panel and a second neighboring panel are constructed.

Next, the panel receiving signals with the maximum received power is identified. If two or more panels receive signals with the same maximum received power, then the panel that has the minimum signal power difference is selected using the first and second tables associated with the two or more panels. For the identified panel, the gain tables associated with its first and second neighboring panels are searched to identify first and second transmission angles, if any. If either the first transmission angle or the second transmission angle or both are available, a transmission angle relative to the transmitting node is determined using the first and second transmission angles. If the first and second transmission angles are null, then the transmission angle is set based on the direction being faced by the identified panel.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIGS. 5A and 5B are simplified schematic block diagram illustrating various configurations of the array control element and the antenna routing element in accordance with the present invention;

FIG. 7 is a representative table showing the measurements taken during the calibration process in accordance with the present invention;

DETAILED DESCRIPTION OF THE INVENTION

Figure 1:
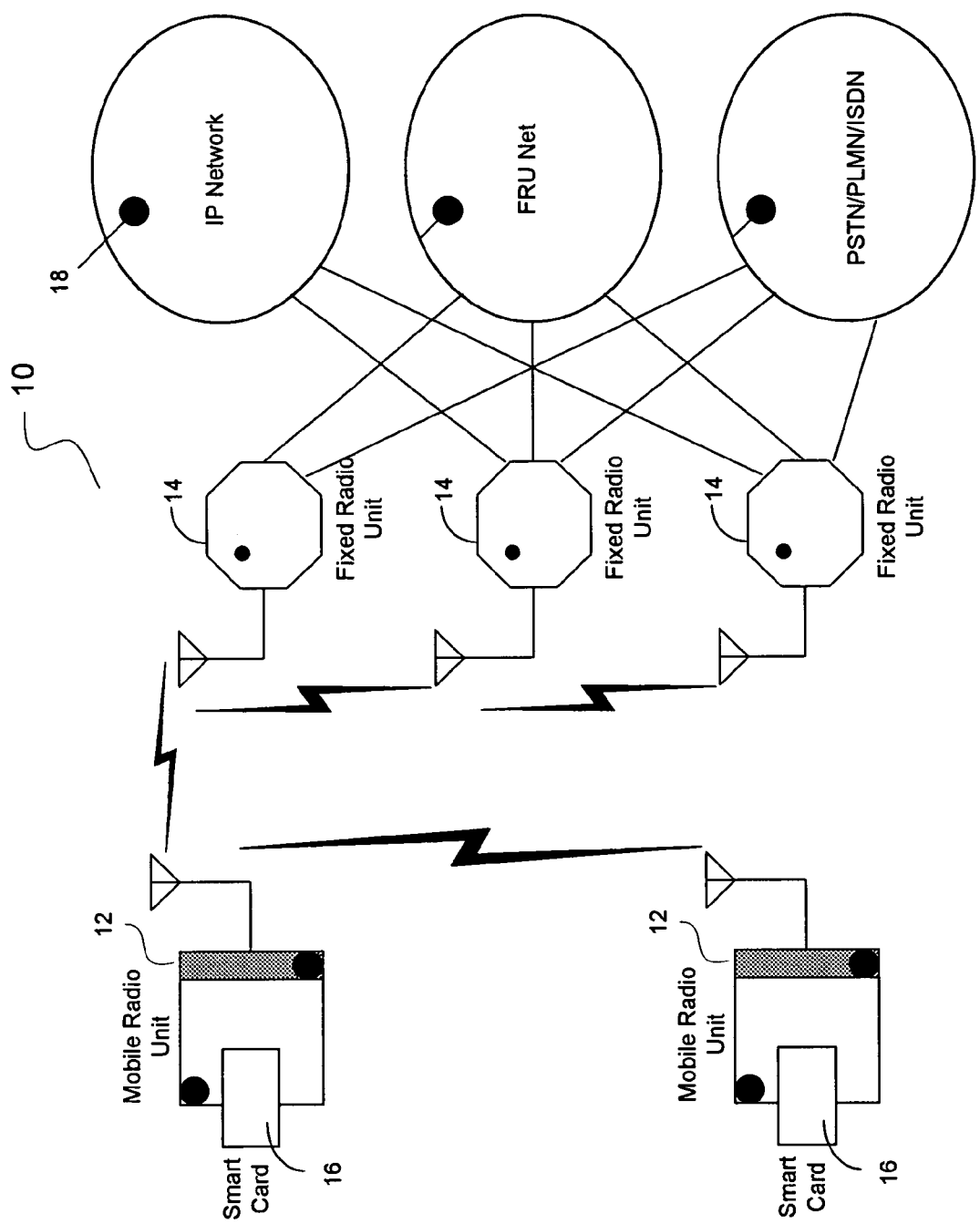
FIG. 1 is a simplified schematic block diagram illustrating one exemplary embodiment of the present invention.

The present invention in the form of one or more exemplary embodiments will now be described. FIG. 1 is a simplified schematic block diagram illustrating one exemplary embodiment of the present invention. In this exemplary embodiment, the network 10 includes a number of mobile radio units (each an MRU) 12 and a number of semi-fixed or fixed radio units 14 (each an FRU). Based on the disclosure and teachings provided herein, a person of ordinary skill in the art will appreciate that other types of devices that are able to send and receive signals, i.e., transceivers, can be used as MRUs or FRUs in accordance with the present invention.

In one exemplary embodiment, the MRU 12 is a user portable device that is capable of handling wireless communications. The MRU 12 includes two types of high bandwidth radio, one is used for long range relay communication and the other for shorter range local communication. The MRU 12 is capable of communicating with nearby MRUs and FRUs 14. The MRU 12 is also capable of communicating with local accessory devices, such as but not limited to, wireless keyboard, wireless mouse, wireless audio devices, etc.

The MRU 12 also includes communication components that are capable of communicating with a secure token, such as but not limited to, a smartcard 16, a subscriber identity module (SIM) card and other types of authentication devices. As will be further described below, the smartcard 16 is used to store user and security information that is specific to a user. The user and security information can be used to provide end-to-end encryption, that is, the user data is encrypted on the MRU 12 and only decrypted by the receiving node. Alternatively, the encryption of the user data can also take place at any intermediate node. In addition, the use of multiple smartcards 16 allows a single MRU 12 to be shared by many different users.

The FRU 14 is a device that utilizes high bandwidth long range radio for communication. The FRU 14 also uses short range radio for local communication with MRUs 12. The FRU 14 is capable of communicating with other FRUs and the MRUs 12. The FRU 14 is also capable of communicating with a number of entities including data storage devices, such as but not limited to, hard disks and DVD/CD-ROM drives, fixed networks, such as but not limited to, the Internet 18, a public switched telephone network (PSTN), and an integrated services digital network (ISDN), and wireless networks, such as but not limited to, a public land mobile network (PLMN), a wireless local area network and a cellular network (e.g., CDMA, GSM and TDMA). In one exemplary implementation, the FRU 14 communicates with a media server that controls access to media and fixed network services. Furthermore, in one exemplary embodiment, the FRU 14 provides an open accessible radio interface (open domain) as a backbone network and a closed radio access (closed domain) for MRUs 12 and their users that are registered with that FRU. As will be further described below, information or services that are available in the open domain allow, amongst other things, communications with other FRUs. In the closed domain, information or services can only be accessed by MRUs or users that are registered with that FRU. Information and services that are available respectively from the open and closed domains of an FRU may vary depending on each specific FRU. Such information and services that are available from an FRU include, for example, applications such as but not limited to games and other utility programs, audio data such as music, video data such as pictures and images, and audio/video data such as movies. There maybe a further subdivision of the closed domain that is used by, for example, media content providers. This could include copyright or other material that has either been purchased or rented by the one or more user(s) of the FRU. In other words, the closed domain may be further subdivided amongst the users that are registered with that FRU, meaning that different users may have different access rights to contents in the closed domain.

The network 10 operates in the following exemplary manners. The network 10 has a number of different types of connections. A semi-fixed long range high bandwidth (HBLR) connection that is used to interconnect the FRU relay points. A short range high bandwidth connection also exists on the MRU and the FRU, that is used to interconnect those devices. The MRU also has a very short range medium bandwidth connection to allow for radio communications with local MRU accessory devices.

When a new FRU is first introduced into the network, the new FRU engages in an initialization mode. When in this mode, the new FRU uses its HBLR connection to listen to or detect other FRUs in the network that are in its locale or coverage area. Upon detecting other FRUs, the new FRU attempts to establish connections with these other FRUs. Other FRUs are detected, for example, by monitoring their radio links or pilot information that maybe periodically broadcast by each device. The pilot information that is sent may include, but is not limited to, FRU identity, status, power information, channel information etc. From these other FRUs, the new FRU determines its relative position in terms of location within the network. Based on this information, the new FRU assigns itself a unique address in the network. In carrying out these actions, the new FRU builds up a table of local FRUs, their respective addresses, radio frequencies that these local FRUs may be using and the quality of the radio links amongst the local FRUs. The position of the new FRU can be determined in a number of ways including, for example, triangulation, GPS receiver or direct knowledge from data input to the device (which can in turn be verified by other means). It should be noted that the new FRU may generate for itself an address that is already in use. When a duplicate address is generated, the neighboring FRUs inform the FRU that its self-assigned address needs to be changed as soon as the FRU uses that address on the network. The FRU MAC address is used to identify the duplicate address. This allows the network addressing to remain homogeneous without duplicate addresses.

By using the foregoing approach, the new FRU is able to establish information about its location in the network and how to route traffic within the network. Once the new FRU has determined its location in the network, the new FRU then announces its presence to other FRUs. The other FRUs within radio contact range of the new FRU then add the new FRU to their route tables and make note of the radio link quality associated with the new FRU. By announcing its presence to other FRUs, the new FRU effectively provides another optional route to these other FRUs for routing their traffic. For example, due to the superior quality of the radio link associated with the new FRU with respect to a particular FRU, this particular FRU is able to provide better QoS using the new FRU.

Once the new FRU is introduced into the network, the FRU acts as an intelligent relay point. A sending FRU wishing to route data to a specific destination looks to transmit the data to a receiving FRU. This decision to transmit the data to the receiving FRU is based on a number of factors, including but not limited to, link quality, radio link quality, number of hops to destination, traffic load conditions, application requesting the data transfer, type of data to be transferred and requested or permitted QoS. Once the receiving FRU is identified, the sending FRU transmits the packet that it wishes to send and the receiving FRU acknowledges receipt of the packet if the packet is successfully received. Alternatively, the receiving FRU may negatively acknowledge receipt of the packet indicating that the receiving FRU either has received a bad packet or has no route for the packet. In the event that the sending FRU does not receive any acknowledgement, which indicates that the transmitted packet was lost, the sending FRU may then optionally look for an alternative route in the form of another FRU to resend the packet. Each packet is associated with the required QoS. This QoS may range from high, for real time traffic, to low, for best effort traffic. In one exemplary embodiment, there are at least four levels of QoS. However, based on the disclosure and teachings provided herein, a person of ordinary skill in the art will appreciate that there could be more or fewer levels of QoS depending on network and/or design requirements or other determinants.

An FRU having traffic to send may also act as a relay point for packets arriving from other FRUs that are in contact with such FRU. Based on the respective sources of the received packets, the FRU is able to determine a more efficient route for packets that it originates and wishes to send. More specifically, upon receiving a packet destined for another FRU or node, the Media Access Control (MAC) layer of the FRU examines the QoS associated with the packet and determines which queue to use for forwarding the packet. Different queues correspond to different routes in the network that are available to the FRU for forwarding packets. Generally, higher QoS packets take priority; however, in order to avoid congestion or packet starvation in the network, lower QoS packets are still serviced in the network depending on the length of the queues. Queuing algorithms are well known in the art. Based on the teachings and disclosure provided herein, a person of ordinary skill in the art will appreciate how to select the appropriate queuing algorithm for use in connection with the present invention. In the case of the network described herein, additional parameters such as radio link quality may also be factored into the QoS algorithm, something that is not normally considered.

The present invention has many benefits and advantages. For example, one of the advantages of the present invention is that the FRUs can be placed anywhere in the network and can then establish their own routes within the network. Indeed, there is no need for any centralized control as maybe found in a traditional wireless or wired network. The present invention provides for a network that is decentralized and can perform peer-to-peer routing without the intervention of a third node or central control to provide routing information. In addition, as more and more FRUs are installed, the average distance between FRUs decreases and this decrease in distance accordingly improves the radio link quality between FRUs. The improvement in radio link quality, in turn, brings about higher bandwidth links between FRUs thereby improving the overall performance of the network.

The routing algorithm used in each FRU takes into consideration several aspects or characteristics of the network. Each FRU receives information relating to such aspects or characteristics from its MAC and radio physical layer. One such characteristic is the quality of the radio links offered to the FRU. Another such characteristic is the congestion level of the network. Additionally, by modifying the power used and bandwidth of the transmission, the FRU may decide to link with another FRU that is not one of the nearest neighbors. This could be used to reduce the number of hops on the route between the source and destination. This could be important in reducing the delays associated with the traffic being sent. Based on the teachings and disclosure provided herein, a person of ordinary skill in the art will appreciate other network characteristics that can be used in connection with the routing algorithm of the present invention.

Furthermore, the routing algorithm also uses conditions specified in a packet. Such conditions include, for example, QoS. Using network characteristics and packet specified conditions as criteria, the routing algorithm then determines the route to be used to relay a packet. For example, if a packet specifies a high QoS, this may require the FRU to identify the shortest route between two network nodes. Consequently, the routing algorithm optimizes a route so that it does not hop through redundant nodes. This could be performed by any node in the network that determines it is not using an optimum route to the destination. The optimum route to the destination can be determined based on a number of factors. For example, an optimum route can be based on the lowest number of intermediary units or a number of intermediary units that is equal to or fewer than a predetermined threshold. Furthermore, intermediary units in the optimum route can be selected based on different factors. For example, one intermediary unit may be included in the optimum route based on its radio link quality; another intermediary unit may be included based on a different criterion such as data rate or congestion. Moreover, the factors or criteria that are used to select an intermediary unit may vary over time. Based on the disclosure and teachings provided herein, a person of ordinary skill in the art will know of other factors that can be used to determine the optimum route to a destination as well as intermediary units to be used in the optimum route. In addition, since the network is radio-based, FRUs may disappear or otherwise become unavailable for a number of reasons including, for example, power failure, thus rendering one or more entries in routing tables obsolete. When an FRU becomes unavailable, the routing algorithm attempts to re-route traffic around the unavailable FRU. If possible, the FRU will alert the network to its offline status by, for example, sending out a broadcast message. This greatly simplifies the network maintenance.

Moreover, each FRU also collects routing and device information from MRU(s) that are available within its coverage area. As will be further described below, the MRU(s) can also be used for forwarding traffic. Hence, such information can be used by the routing algorithm of the FRU to generate an optimum route.

Based on the teachings and disclosure provided herein, it can be seen that, when directed to do so, the routing algorithm associated with each FRU continuously selects the optimum route based on both user application and traffic requirements. Unlike conventional wireless technologies that often utilize worst case RF design principles, the present invention as described above is capable of optimizing its own performance in response to prevailing conditions. For example, an FRU may have initially selected the route with the best link quality in order to maximize success of the transmission. However, if other links appear with a better quality, then the FRU has the option to switch to those other links, even in the middle of packet transfers.

Another advantage of the present invention is that it can take into consideration congestion on the network. In most current wireless systems, the capacity of the network is designed for worst case conditions. This usually means that several nodes are much larger and therefore more expensive than would normally be required under average conditions. However, in the network described above, the network is able to take into account congestion problems that may occur subsequently and re-route traffic further upstream thus avoiding the congestion point. Hence, nodes in the network only need to be designed to carry the average load, thereby significantly reducing the cost of the network deployed.

In addition to having the capability to communicate with other FRUs, each FRU optionally includes the capability to access one or more fixed networks in order to provide connectivity to various other types of services, such as, web or voice services. In one exemplary implementation, an FRU includes a set of fixed connections that allow communications with other fixed networks, such as, the Internet and the PSTN. By having access to one or more fixed networks, the FRU allows a user to enjoy additional services provided by such networks.

In one exemplary embodiment of the present invention, MRUs can also be used to facilitate communications in the network. Each MRU includes a similar short range high bit rate radio connection (HBSR). The use of the HBSR connection allows an MRU to communicate with the FRUs and/or other MRUs in its locality. Communications with other MRUs effectively allow smaller networks to be set up within the network, especially if an MRU is not within range of an FRU. The MRU uses the same routing algorithm as described above in connection with the FRU to route traffic to a nearby FRU or MRU. Therefore, it is possible for the network to take advantage of a cluster of MRUs to route traffic through a congested area. The MRU initially looks to route any data it may have to send to an FRU first. However, if the MRU is located on the edge of the network, the MRU can use the routing algorithm to direct traffic via one or more MRUs to reach an FRU. Also, congestion is likely to occur where MRUs cluster due to traffic generated by such MRUs. Such MRU cluster can be used to reduce congestion. Instead of traffic going through nearby FRU(s), traffic can be routed through one or more MRUs within the MRU cluster thereby avoiding overloading any nearby FRU(s). By using the foregoing approach, network capacity is created dynamically and does not need to be statically set as would be required in a traditional wireless network.

Furthermore, the connectivity of the MRU is not fixed. An MRU can take advantage of any other connectivity that might be available. An MRU is able to identify the most appropriate FRU(s) and/or MRU(s) for transmitting traffic on a dynamic basis depending on the network conditions. For example, even when the MRU remains temporarily fixed within a certain area, an FRU or MRU that was previously used by the MRU to route traffic may become unavailable. When this occurs, the MRU uses its associated routing algorithm to dynamically select another FRU or MRU that is most suitable or effective for routing its traffic. In another example, the MRU physically roams from one area to another. As a result, the previously selected FRU or MRU may no longer be the most suitable or effective for routing traffic for the roaming MRU. Hence, the roaming MRU may similarly use its associated routing algorithm to dynamically select another FRU or MRU for routing its traffic.

Since the MRU is capable of communicating and exchanging traffic with the FRU(s) and other MRU(s), the routing algorithm used by the MRU utilizes information received from the FRU(s) and/or other MRU(s) as well as other information to identify the most appropriate FRU(s) and/or MRU(s) for routing its traffic. For example, the MRU may detect all the FRU(s) and/or MRU(s) that are available to it for routing traffic and the routing algorithm associated with the MRU then determines which one or more of the detected FRU(s) and/or MRU(s) are most appropriate for routing its traffic. In determining the most appropriate FRU(s) and/or MRU(s), the MRU may evaluate a number of factors including, for example, the radio link quality of the detected FRU(s) and/or MRU(s) and routing information already collected by the respective detected FRU(s) and/or MRU(s). For example, an MRU that is trying to communicate with another MRU that is in its radio range may choose to use an intermediary MRU or FRU in order to improve the bandwidth or other QoS that may be required for the active service. Based on the teachings and disclosure provided herein, a person of ordinary skill in the art will appreciate how to select factors that can be used in determining the most appropriate FRU(s) and/or MRU(s) in accordance with the present invention.

The MRU is further capable of communicating with other local devices using its short range medium bandwidth radio. These local devices include, for example, headsets, LCD screens or other accessories that are designed to provide or receive information from the MRU. For instance, the FRU may transmit music in the form of audio data to the MRU. The MRU, in turn, forwards the audio data to a headset which allows a user to listen to the music. Similarly, the FRU may transmit video images in the form of video data to the MRU. The MRU then forwards the video data to a LCD screen which allows the user to view the video images; alternatively, the video data maybe further forwarded to a suitably equipped nearby television or other display means for display.

As described above, the topology of the network of the present invention is dynamic. Since the topology of the network is dynamic, the coverage of the network can expand or contract depending on the number of FRU(s) and MRU(s) that are currently operational at any instant. Furthermore, as more and more FRU(s) and MRU(s) are added to the network, the network can perceivably extend to cover large geographical areas.

Also as mentioned above, an MRU 12 is capable of accommodating a secure token, such as but not limited to, a smartcard 16, a SIM card and other types of authentication devices. Information stored on the smartcard 16 includes user and security information relating to the user, such as but not limited to, serial number, biometric data, keys associated with the user. Such information can be used to provide end-to-end encryption on the network to improve security. When a user attempts to access the Internet, user data or any entity associated with the FRU, the control logic associated with the FRU recognizes the destination for the issued command and uses the security information (such as, the keys associated with the user) extracted from the smartcard 16 to authenticate the user (or the MRU) and encrypt the data stream. When the data arrives at the destination FRU, the data can be decoded only if the source of the data is from an authentic MRU. Furthermore, in one exemplary implementation, the authentication is location dependent, meaning that the user (or the MRU) is only authenticated when the user (or the MRU) is located at a specific geographic or physical location, or alternatively, when the user (or the MRU) communicates with a specific FRU. By using the foregoing approach, data can be encrypted and the user sending the data can also be authenticated. Encryption and authentication techniques are well known in the art. Based on the teachings and disclosure provided herein, a person of ordinary skill in the art will know how to select and implement the appropriate encryption and/or authentication techniques for use in connection with the present invention. Since the encryption is end to end, this approach allows the user to employ relay nodes secure in the knowledge that the intermediate nodes cannot eavesdrop on the transmission.

In addition to providing end-to-end encryption, alternatively, some portions or links of the optimum route are protected with encryption while other portions are not, and different portions of the optimum route can be protected using different encryption codes or technologies. This is advantageous for a number of reasons. For example, in order to comply with certain country specific regulatory or other issues, it may be necessary to terminate the secure link at one or more intermediary nodes and then forward the traffic using a different encryption code or in clear text; in another instance, it may also be required to re-encrypt the already encrypted channel with another encryption code.

From a user perspective, the network 10 can be used to send and receive data in an efficient and simple manner as illustrated below. A user (or alternatively, an MRU) is registered to a user FRU. User and security information associated with the user is stored in a smartcard. Such information is used to identify and authenticate the user when a local MRU being used by the user attempts to establish communication with the user FRU. Once the user is authenticated, information or services that are available from the closed domain of the user FRU can be accessed by the user using the local MRU. Such information or services from the closed domain include, for example, a song or a movie that has been stored by the user in a storage device that is accessible to the user FRU.

In one situation, the local MRU being used by the user is in direct communication with the user FRU. In other words, there are no intermediate FRU(s) and/or MRU(s) between the local MRU and the user FRU.

In a second and perhaps more common situation, the user wishes to use a remote MRU to retrieve information and/or services from the closed domain of the user's FRU. The remote MRU is located out of range of the user FRU and, hence, direct communication is not possible. Consequently, as described above, an appropriate route having intermediate unit(s) is identified by the remote MRU in order to allow the remote MRU to communicate with the user FRU. The intermediate unit(s) include one or more FRU(s) and/or MRU(s). Similarly, information stored in the smartcard is retrieved by the remote MRU and is used to authenticate the user to the user FRU. Information from the smartcard further allows secure transmission on the route established between the remote MRU and the user FRU. Once the route is identified, information and services that are available from the closed domain of the user FRU can be provided to the user via the remote MRU. As mentioned above, the route used for communications between the remote MRU and the user FRU may change on a dynamic basis depending on a number of factors, such as, existing network conditions and conditions specified in the packets to be transmitted. In other words, the intermediate unit(s) that are used to carry traffic between the remote MRU and the user FRU may change dynamically from time to time.

In one exemplary embodiment, the present invention is designed to operate in the 5 GHz NNII/UNII bands. However, based on the disclosure and teaching provided herein, it should be appreciated by one of ordinary skill in the art that the present invention could be used at any frequency.

In one exemplary embodiment, the FRU includes an array antenna that is designed to facilitate routing of traffic in the network as described above. In one embodiment, the array antenna includes six (6) antenna panels or elements arranged in an hexagonal shape. Each antenna panel contains a number of patch antennas, the combination and number of these patch antennas define the gain and bandwidth of the antenna panel. Each individual antenna panel is capable of providing approximately seventeen (17) dBi of directional gain, the half power beam width is approximately sixty (60) degrees. Different beam widths and antenna gains can be configured by changing the etched antenna pattern. Similarly, the number of panels can be changed while still adhering to the algorithms described herein. Moreover, in one embodiment, the antenna panels can be used in combination from one (1) to six (6) to provide the desired level of gain for the location of the receiving FRU. In other words, in addition to the ability to use each antenna panel individually, two or more or all of the antenna panels can be active or used simultaneously for transmitting signals. Control of the beam could be performed by adjusting the amplitude and phase weights of the signal directed toward each antenna panel or by simply switching the RF signal between each panel. Based on the disclosure and teachings provided herein, it will be appreciated by a person of ordinary skill in the art that control can be provided by low cost hardware.

Using the foregoing approach allows the network to use a lower gain antenna when the FRUs are in close proximity and provides a directional antenna that is capable of broadcasting two or more different signals in two or more directions at different frequencies simultaneously or in quick succession.

Figure 2:
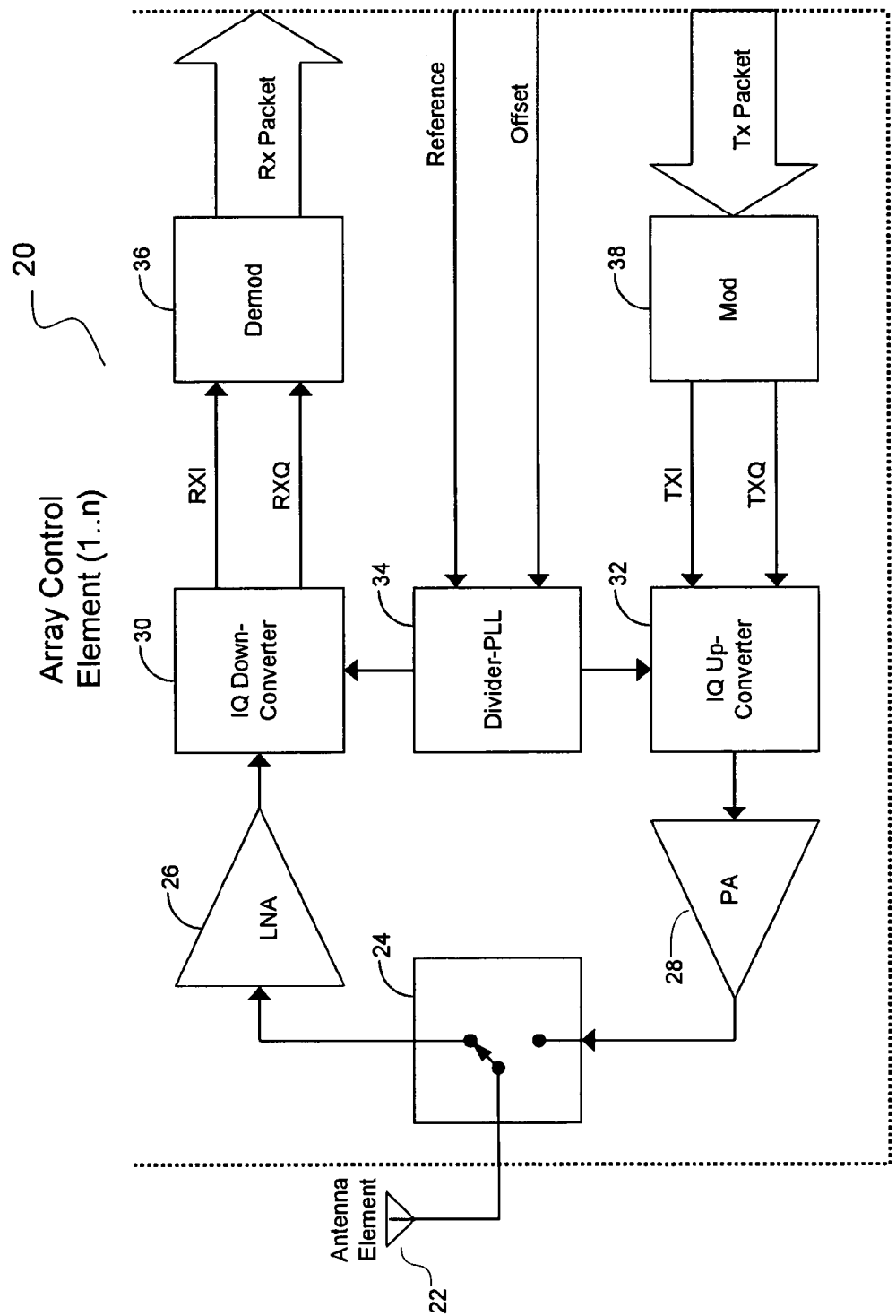
FIG. 2 is a simplified schematic block diagram illustrating an exemplary embodiment of an array control element that is used to control an antenna element in accordance with the present invention.
Figure 3:
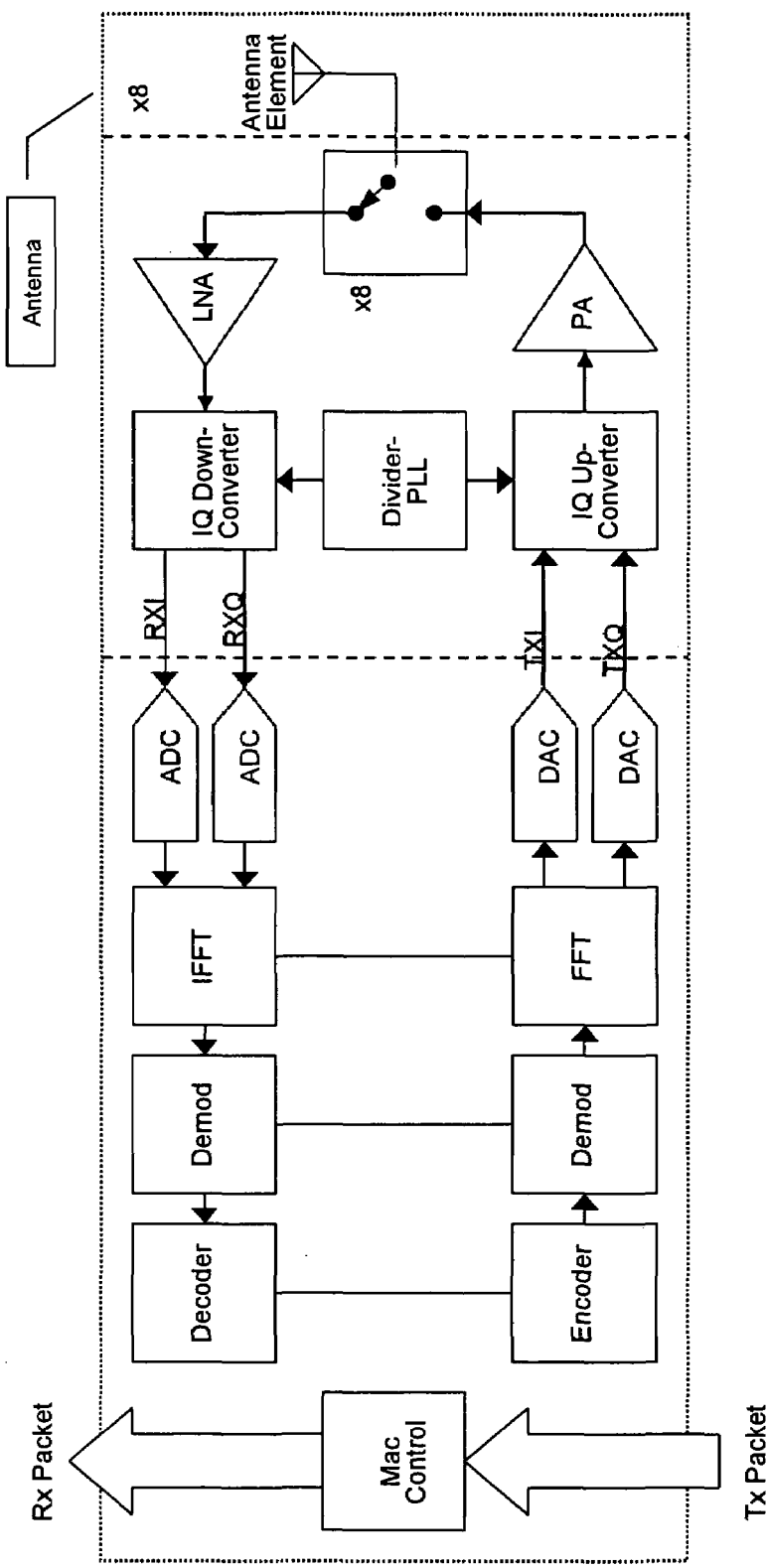
FIG. 3 is a simplified schematic block diagram illustrating a data path associated with the array control element shown in FIG. 2.

FIG. 2 is a simplified block diagram illustrating an exemplary embodiment of an array control element 20 that is used to control an antenna panel or element 22 in accordance with the present invention. Referring to FIG. 2, in one exemplary embodiment, the RF signal being used is either TDD (time division duplex) or CSMA (carrier sense multiple access). Alternatively, other schemes can be used in connection with the array control element 20 as shown in FIG. 2. The antenna element 22 connects via a switch 24 to an receiving Low Noise Amplifier (LNA) 26 and a transmitting Power Amplifier (PA) 28. The LNA 26 and the PA 28 could be separate low cost devices or, alternatively, could be integrated into an integrated circuit. The array control element 20 also includes an I/Q down converter 30 and an I/Q up converter 32 for the I/Q baseband signal. An RF data path associated with the array control element 20 is shown in FIG. 3. As shown in FIGS. 2 and 3, when a signal is received by the antenna element 22, the signal is relayed via the switch 24 to the LNA 26. The LNA 26, in turn, outputs the signal to the I/Q down converter 30. Outputs from the I/Q down converted 30 are then forwarded to a demodulator 36 to generate the corresponding packet. When a packet is to be transmitted, the packet is forwarded to a modulator 38. Outputs from the modulator 38 are then provided to the I/Q up converter 32. Output from the I/Q up converter 32 is then forwarded to the PA 28. Output from the PA 28 is then provided to the antenna element 22 via the switch 24 for transmission. In one exemplary embodiment, OFDM (orthogonal frequency division multiplexing) is used as the modulation scheme. Based on the disclosure and teachings provided herein, a person of ordinary skill in the art will appreciate other modulation schemes that can be used.

As shown in FIG. 2, the signals "reference" and "offset" are used to control a divider PLL (phase lock loop) 34 which, in turn, controls the I/Q down and up converters 30 and 32. The "reference" and "offset" signals control the array control element 20 such that the antenna element 22 can be part of the array antenna so as to provide the desired directional beam. In one exemplary embodiment, these signals originate from a digital-to-analog converter which is embedded within the same integrated circuit as the array control element 20. Alternatively, the digital-to-analog converter may be external to the integrated circuit containing the array control element 20.

In one exemplary embodiment, the antenna element 22 is designed such that the antenna element 22 can transmit or receive the packet data itself. The demodulator 36 and the modulator 38 can be integrated into the integrated circuit containing the array control element 20; or alternatively, they may be external to the integrated circuit.

The array control element 20 is able to generate data related to link quality and received power/signal strength. In addition, the array control element 20 is also able to control the transmit power of the FRU. In an exemplary embodiment where TDD or CSMA is used, array control element 20 allows the FRU to determine which other FRUs are located nearby. The direction of any transmission can also be estimated by examining the received power or signal quality from the antenna element 22. Data relating to transmission direction can be tagged onto the end of the received data packet as the packet is forwarded by the array control element 20 to other components of the FRU.

As mentioned above, one of the operational aspects of the FRU is its ability to route or relay traffic through the network formed by the FRUs. In one exemplary implementation, in order to reduce impact on the central processing unit used in the MRU and make the relay function more efficient, at least the relay function is performed within one or more ASICs (application specific integrated circuits).

Figure 4:
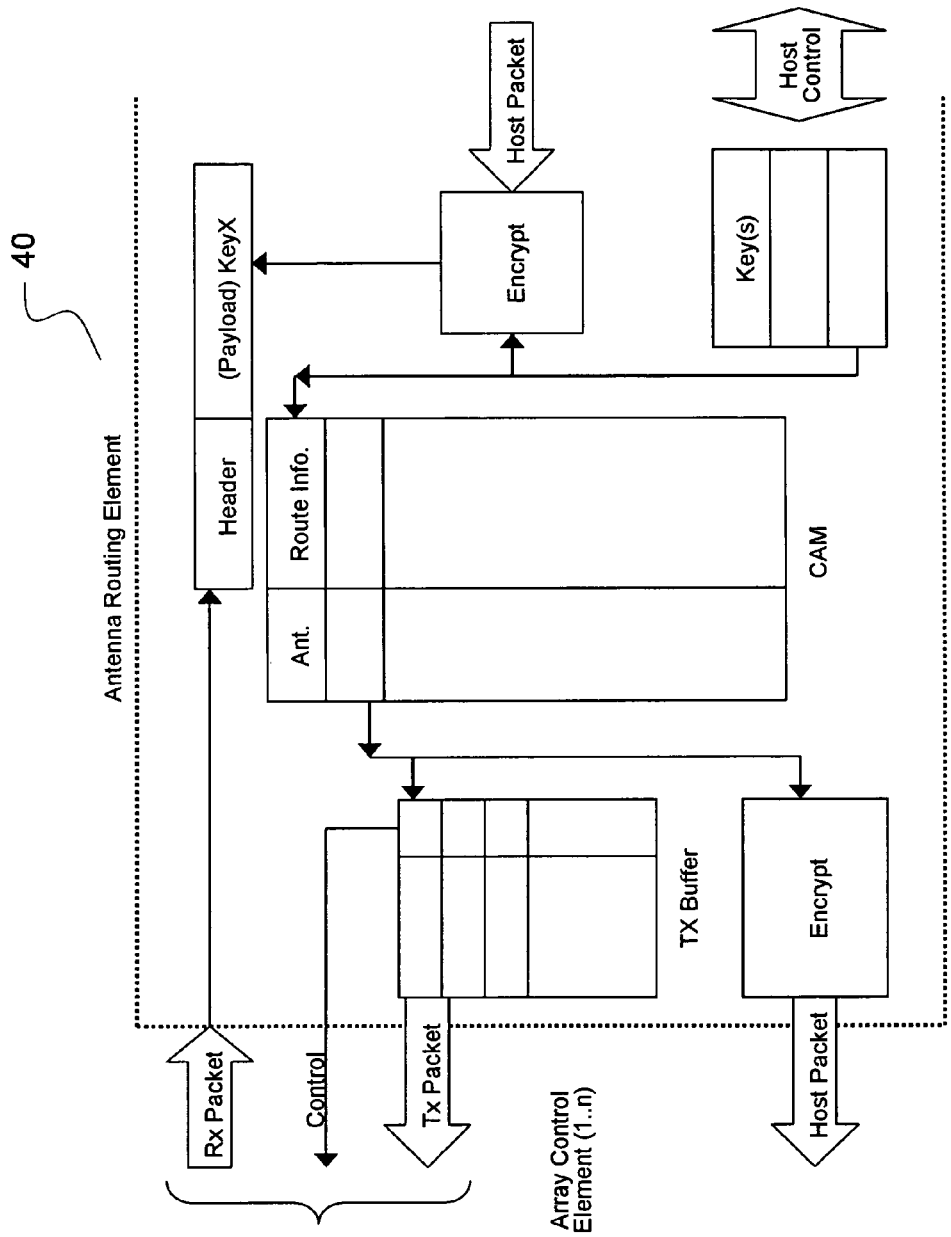
FIG. 4 is a simplified schematic block diagram illustrating one exemplary embodiment of an antenna routing element in accordance with the present invention.

FIG. 4 is a simplified block diagram illustrating one exemplary embodiment of an antenna routing element in accordance with the present invention. In one exemplary embodiment, the antenna routing element 40 is implemented within an ASIC. The antenna routing element 40 is used to handle the traffic relay function. As shown in FIG. 4, the antenna routing element 40 interacts with the array control elements 20 to perform packet routing functions. The antenna routing element 40 accepts input from the array control elements 20. The input provided by the array control elements 20 includes, for example, raw packet data, directional data and received power information. Such input provided by the array control elements 20 also allows the antenna routing element 40 to perform a number of other functions, including, for example, determining signal quality and signal strength of a received signal.

In one exemplary implementation, each packet being sent around the network via FRUs includes a header and payload data. Preferably, the payload data is encrypted. The encryption is performed by the originating entity, i.e., either another MRU or FRU. The keys used to encrypt the payload data may be different for the receive and transmit paths. As shown in FIG. 4, the antenna routing element 40 is equipped to perform encryption and decryption functions with respect to received and transmitted packets.

The header includes the destination and sources addresses in clear text, although these addresses may not be the real MRU or FRU addresses since proxies may be in use. The header also contains information regarding QoS expected for the packet. Other QoS schemes are possible using flow control or other methods. Furthermore, the header may also include other information that can be used to assist in the efficient routing of the packet including, for example, time to live (TTL) information or sequence numbers. By using the information provided in the header, the antenna routing element 40 is able to check the validity of a packet and discard those packets that are corrupted thereby reducing waste of resources.

The antenna routing element 40 includes memory that is used to store routing tables of interest to an FRU. Each routing table includes information related to routing to address locations and information related to direction from which the transmission was received. When an incoming packet is received and validated, the packet is checked against information stored in the routing tables. In one exemplary implementation, the check is performed using content addressable memory (CAM) that is indexed by header information. It should be understood that other options are available for use to perform the check. The CAM includes information related to destination, QoS and TTL etc. By using the CAM, the antenna routing element 40 is able to determine the next port on which to route the packet. If it is determined that the packet need not be routed any further, i.e., the FRU that received the packet is its final destination, then the packet is forwarded to a decryption module and onto lower layers of the FRU for additional processing. If it is determined that the packet is to be further routed to another entity, then the packet is tagged with additional information that provides the settings for the corresponding array control element 20 including QoS and queue information for transmission. In an exemplary embodiment, the FRU maintains several queues to provide differentiated levels of QoS for packet transmission.

If a data packet (not a control packet) is received from the FRU, the payload data is first encrypted. The proper route for the packet is then determined and the packet is then sent to the routing queue for transmission.

When the packet is sent for transmission, the additional bits tagged onto the end of the packet are stripped off and used to set the control data on the antenna elements in the corresponding array control elements 20. This provides directionality to the data being sent and also indicates other information such as, for example, power levels from the FRU.

Control of the antenna routing element 40 is provided by a control interface within the FRU. The control interface provides encryption information for encoding and decoding packet data. The control interface also allows the FRU to insert control information into the data stream as well as data packets to be sent. Control information may include, for example, identity of the FRU, name, location; route broadcasts, availability, congestion level, cache resources, network management and configuration data, synchronization data. Preferably, control packets are short and have the highest priority.

Furthermore, if the FRU is powered down for whatever reason, the antenna routing element 40 autonomously detects the loss of power and transmits a "disconnect" message to the network such that any neighboring FRUs and MRUs can promptly detect the loss of this FRU as a node. Reconnection to the network is under the control of the FRU.

In one exemplary embodiment, the array antenna is implemented in a silicon or GaAs integrated circuit for use in the FRU. Based on the disclosure and teachings provided herein, a person of ordinary skill in the art will know of other ways and/or methods to implement the array antenna in accordance with the present invention.

The antenna elements 22, the array control elements 20 and the antenna routing element 40 can be arranged in various configurations in an FRU. FIGS. 5A and 5B show two illustrative configurations. For example, in one embodiment shown in 5A, one array control element 20 is coupled to one antenna element 22. A number of array control elements 20 in turn are coupled to one antenna routing element 40. In another embodiment shown in FIG. 5B, one array control element 20 is coupled to a number of antenna elements 22 via a switch (not switch). The switch allows one antenna element 22 to be coupled to the array control element 20 at any one time. The array control element 20 in turn is coupled to an antenna routing element 40.

Figure 6:
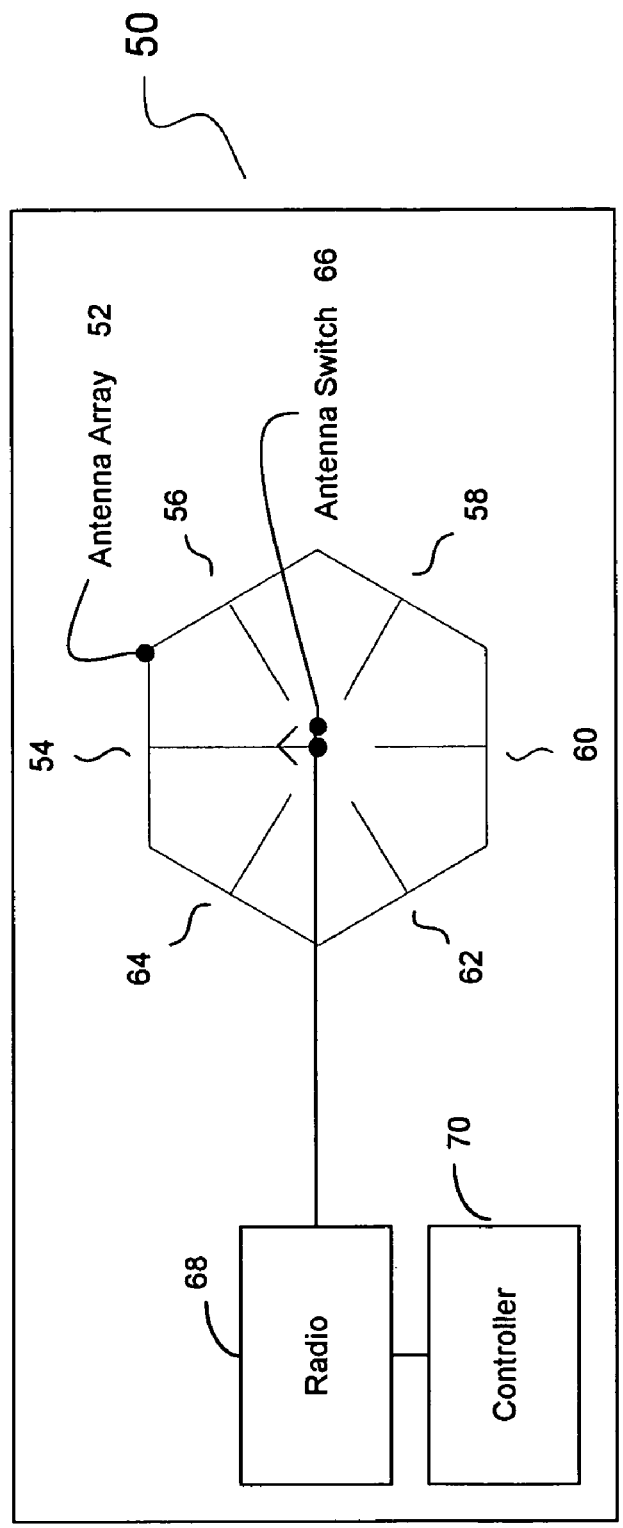
FIG. 6 is a simplified schematic block diagram illustrating an exemplary embodiment of a wireless node within the network in accordance with the present invention.

In one exemplary embodiment, the network also allows a wireless node to determine the direction of a source or transmitting node relative to itself. FIG. 6 is a simplified schematic diagram illustrating an exemplary embodiment of a wireless node within the network in accordance with the present invention. As shown in FIG. 6, the wireless node 50 includes an antenna array 52 which is made up of six (6) switched panel antennas 54–64 controlled by an antenna switch 66. In this exemplary embodiment, six (6) antennas 54–64 are used; however, fewer or more can be used. The panel antennas 54–64 are linked to a wireless transceiver 68. In turn, the wireless transceiver 68 is linked to a controller 70. The controller 70 can be a microprocessor or an ASIC on the transceiver 68. The controller 70 effects the switching of the antennas 54–64 within the antenna array 52 via the transceiver 68 and the antenna switch 66.

Before the wireless node 50 can be used to determine the direction of a transmitting node, the antenna array 52 is first calibrated. More specifically, each antenna 54–64 within the antenna array 52 is calibrated to provide the calibration data. The calibration process includes measuring the antenna gain at various angles in the azimuth. This results in a beam pattern which relates to angle and antenna gain. FIG. 7 is a representative table showing the measurements taken during the calibration process. As shown in FIG. 7, the measurements are taken every 5°. Alternatively, the measurements can be taken every 1° or at other appropriate degree increments. Optionally, additional measurements can be interpolated as needed at the time of use. These measurements are then stored as tables in a memory in the wireless node for subsequent use as will be further described below. Based on the disclosure and teachings provided herein, a person of ordinary skill in the art will know how to make and store the appropriate measurements. From these tables, a "delta table" is produced for each antenna panel and its neighbor, this table is generated by subtracting the main antenna panel gain data from the left or right neighbor patterns for each of the matching angles, for example, the 0 degree gain for the main antenna panel would correspond to the 60 degree gain for the left neighbor and similarly the 300 degree gain would correspond to the 0 degree gain for the right neighbor. Since the antenna array 52 is symmetrical, it is only necessary to store two delta tables: left and right neighbors. These tables are then used in the method described below.

Figures 8, 9:
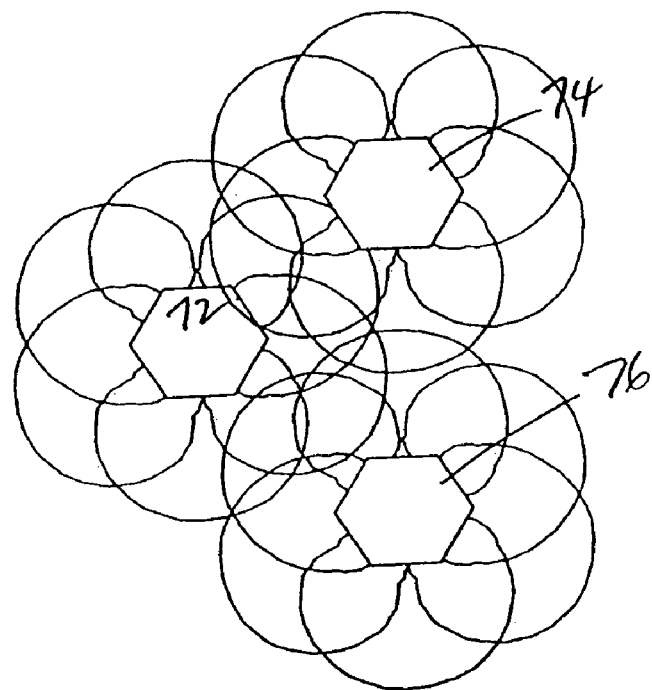
FIG. 8 is a simplified schematic block diagram illustrating a number of wireless nodes within the network.
FIG. 9 is a representative table showing data obtained from various antennas within a wireless node in accordance with the present invention.

FIG. 8 is a simplified diagram showing a number of wireless nodes within the network and their projected antenna beam patterns. Wireless node 72 is the source or transmitting node and wireless node 74 is the destination or receiving node. Wireless node 76 is another node that is used to provide another possible reference point. In this example, the transmitting node 72 transmit its signals on a known frequency to the receiving node 74. In its simplest form, the signals transmitted include a known repeating pattern which could be used to determine when a signal is a reflection or there is multi-path reception to further improve performance of the wireless node 72 in terms of providing better directional resolution. Optionally, the transmitting node 72 also transmits information related to its longitude and latitude and the RF power being used to transmit the signals. In addition, the node 72 may also measure the reception bit error rate to determine the quality of the signal being received.

In order to determine the direction of the transmitting node 72, the receiving node 74 directs the antenna array 52 to cycle through all the antenna panels 54–64 using the antenna switch 66. Data from each antenna panel 54–64 is then captured. FIG. 9 is a representative table showing data from the various antenna panels 54–64. As shown in FIG. 9, the representative table includes data related to the received signal strength for each of the antenna panels 54–64. As will be further described below, the captured data is used in conjunction with the calibration measurements to determine the direction of the transmitting node 72 relative to the receiving node 74.

But before the captured data from the various antenna panels 54–64 is used to determine the direction of the transmitting node 72, the receiving node 74 first ascertains or validates that the captured data indeed can be used for that purpose. For example, if it was determined that readings from an antenna panel was not a direct path to the transmitting node 72, then results from that antenna panel could be eliminated from further consideration. In another example, the antenna panel facing most directly to the transmitting node may be obstructed, in which case, the neighboring antennas may show spuriously high results which, in turn, may indicate that the transmitting node cannot be used to determine direction. Other schemes could be used to eliminate false or misleading readings taken by the receiving node 74. Consequently, based on the disclosure and teachings provided herein, a person of ordinary skill in the art will know how to validate the captured data in accordance with the present invention.

After the captured data has been validated, the wireless node 74 performs the following analysis to determine the direction of the transmitting node 72. First, from the captured data, the wireless node 74 determines which of the antenna panels 54–64 within the antenna array 52 receives signals with the maximum received power. Since directional information is available for each of the antenna panels 54–64, the direction of the transmitting node 72 can be determined once the antenna panel receiving signals with the maximum received power is identified.

The method used by the receiving antenna array 52 in an FRU or receiving node 74 to determine the direction of the transmitting node 72 is illustrated with the pseudo-code shown in Table 1 below. The numbered lines will be used to discuss the pseudo-code in Table 1.

TABLE 1

1. {For # of panels determine Panel with Max_Receive_Power.
2. If two or more panels = Max_Receive_Power then
3. { Calculate Min power difference between
      Max_Received_Power Panel and Left and Right neighbor
      Panels.}
4. Set Selected_Panel = Max_Receive_Power Panel
5. Right_Delta = Max_Receive_Power Panel − Right_Panel_Power
6. Left_Delta = Max_Receive_Power Panel − Left_Panel_Power
7. {For angle = 0 to 60
8. search Panel_Azimuth_Gain table
9. If Power match found then
10. Right_Panel_Angle = Found_Angle
11. else
12. No Result
}
13. {For angle = 300 to 0
14. search Panel_Azimuth_Gain table
15. If Power match found then
16. Left_Panel_Angle = Found_Angle
17. else
18. No Result
}
19. Min_Angle_Delta (Left_Panel_Angle, Right_Panel_Angle)
20. Angle from Max_Receive_Power Panel = Min_Angle_Delta/2

The method is shown as pseudo-code. However, it should be understood by a person of ordinary skill in the art that the method could be implemented in any modern programming language or in digital hardware or a combination of both. Referring to Table 1, lines 1 . . . 3 are used to filter the raw readings. The intent is to select at least three panel readings that are closest since they will provide the most accurate direction options. The scheme calculates the power differences between the antenna panel with the maximum received signal strength and its left and right neighbors. If there are two antenna panels that report an identical maximum signal strength, the minimum delta is then selected for use in the next steps. In some implementations, it should be noted that the maximum power reading is provided with an upper and lower bound due to inherent quantization errors in reading data with a digital to analog converter. Lines 4 ... 6 set the data for the next steps with the selected antenna panel. Lines 7 ... 12 are used to search the previously stored azimuth delta power gain data to look for a match on the calculated power differences generated in lines 1 ... 3. In one embodiment, the search is restricted to a 60 degree window since this not only speeds up the search, but more importantly, it represents the maximum overlap for the two antenna panels (right neighbor and "max gain antenna"). However, it should be understood that the search angle can be varied in practical use. The angle searched would be different depending upon the number of antenna panels in the antenna array. It should also be understood that there may be an instance when no match can be found meaning that the outcome is a null.

Lines 13 ... 18 simply repeat the above process for the left neighbor antenna panel. This process generates an angle of incidence as the highest likelihood for the position of the transmitting node 72. Lines 19 ... 20 use the angle results generated by the preceding lines to calculate the final results. Line 19 calculates the 'Minimum Angle' between the two generated results. Line 20 then divides this by 2 and adds/subtracts it to/from the angle of the antenna panel with the maximum received signal strength to produce the final angle of incidence to the transmitting node 72. In this case, using the 'Minimum Angle' found in the searches described above eliminates the case where no solution is found in one of the searches. If no solution is found in either search, then the angle defaults to the angle of the antenna panel with the maximum received signal strength. Once the angle is selected, the delta is then the average of the two angles. The delta is then used to produce an offset from the main antenna panel.

Upon completing the foregoing analysis, the receiving node 74 is able to obtain information relating to a bearing from the transmitting node 72 relative to itself. This information can then be used with information from another node, for example, node 76, in a triangulation analysis to determine the relative location of the receiving node 74. If longitude or latitude information from the transmitting node 72 is known to the receiving node 74, then it is possible for the receiving node 74 to calculate a sufficiently accurate position that can be used to determine its location address within the network. Based on the disclosure and teachings provided herein, a person of ordinary skill in the art will appreciate how to utilize triangulation analysis and longitude or latitude information to determine the optimum route in the network in accordance with the present invention.

Optionally, in another exemplary embodiment, the receiving node 74 also performs a number of additional analyses or functions to further improve the accuracy of the directional determination relative to the transmitting node 72. Such additional analyses or functions include, for example, an analysis that is performed to eliminate reflections. By monitoring the delay of data arriving at each antenna, the receiving node 74 can determine which signals have been reflected before they arrive at the antenna. By eliminating any data that is due to reflections and amending the captured data to provide a more accurate power reading, the receiving node 74 is able to increase the accuracy of the directional determination with respect to the transmitting node 72.

Another additional analysis or function that can be performed by the receiving node 74 includes power determination. If the transmitting node 72 indicates the RF power being used to transmit the signals, then the receiving node 74 can utilize an RF model to roughly predict the distance to the transmitting node 72. This distance can be averaged over the various antennas 54–64 to provide a more accurate resolution on the distance. Furthermore, if a number of other nodes are also monitored, then it is possible to more accurately locate the receiving node 74. This especially true if there are no direct paths between two nodes.

Yet another additional analysis or function that can be performed by the receiving node 74 includes analysis of GPS information. The transmitting node 72 can be equipped with a GPS receiver which provides accurate longitude and latitude information. This information can be transmitted with other signals by the transmitting node 72 to the receiving node 74. If sufficient GPS-equipped transmitting nodes are located in the network, then GPS information can be forwarded to various nodes making it possible for all non-GPS-equipped nodes to determine their own respective longitudes and latitudes.

It should be understood that the foregoing description provided with respect to directional determination by a wireless node applies equally to both static and mobile nodes. For example, the MRU and the FRU as described above are both capable of making directional determination in accordance with the present invention.

It should be understood that the present invention can be implemented in the form of control logic using software, hardware or a combination of both, in a modular, distributed or integrated manner. Based on the teachings and disclosure provided herein, a person of ordinary skill in the art will know of other ways and/or methods to implement the present invention.

Although the present invention has been described with reference to specific embodiments thereof, these embodiments are merely illustrative, and not restrictive, of the present invention. For example, although the system has primarily been described with respect to radio-frequency transmissions, any type of communication link that permits mobile transceivers is possible. For example, infrared or other portions of the electromagnetic wave spectrum, acoustic or other communication links can be used. Fixed and mobile units can be provided with many different types of processing ability, or very minimal, or no, processing ability. For example, a device may merely act as a repeater to send data along to another device.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An array antenna comprising:
    a plurality of antenna panels each configured to transmit and receive signals;
    one or more array control elements, each array control element configured to couple to at least one antenna panel or to couple via a switch to any one of the plurality of antenna panels and further configured to process the transmitted and received signals; and
    an antenna routing element configured to:
        communicate with the one or more array control elements;

route packets generated based on the received signals and to forward packets that are destined for transmission; and issue a "disconnect" message when the array antenna is powered down.

2. The array antenna of claim 1 wherein the plurality of antenna panels are arranged in a hexagonal configuration.

3. A fixed radio unit incorporating the array antenna as recited in claim 1.

4. The array antenna of claim 1 wherein two or more of the plurality of antenna panels are capable of being used simultaneously for transmitting respective signals.

5. The array antenna of claim 1 wherein at least one of the array control element includes:

a switch coupled to an antenna panel;

a low noise amplifier coupled to the switch to receive the received signals from the antenna panel and generate an output;

an I/Q down converter configured to receive the output from the low noise amplifier and generate a first output and a second output;

a demodulator configured to receive the first and second outputs from the I/Q down converter and generate a received packet;

a modulator configured to receive a packet to be transmitted and generate a first output and a second output based on the packet to be transmitted;

an I/Q up converter configured to receive the first and second outputs from the modulator and generate an output; and a power amplifier configured to receive the output from the I/Q converter and generate an output, the power amplifier further coupled to the switch to forward its output to the antenna panel for transmission;

wherein the switch is controlled by logic to couple the antenna panel to either the low noise amplifier or the power amplifier depending on whether signals are to be received or transmitted.

6. The array antenna of claim 5 wherein the antenna routing element is further configured to generate and forward the packet to be transmitted to the one or more array control elements for transmission;

wherein the antenna routing element further includes a routing table having routing information; and wherein the antenna routing element is further configured to receive the received packet from the at least one of the array control elements and forward the received packet based on routing information in the routing table.

7. The array antenna of claim 5 wherein the received packet includes header and payload information; and wherein the header information includes information relating to a quality of service for the received packet.

8. An integrated circuit having the one or more array control elements and the antenna routing element as recited in claim 1.

9. The array antenna of claim 1 wherein the antenna routing element is further configured to check the validity of the packets generated based on the received signals before such packets are routed further.

10. The array antenna of claim 1 wherein the one or more array control elements are assigned respective transmission priorities; and wherein the antenna routing element is further configured to forward the packets destined for transmission to the one or more array control elements depending on a quality of service criterion associated with each packet.

11. The array antenna of claim 1 wherein the antenna routing element is further configured to determine signal quality of the received signals.

12. The array antenna of claim 1 wherein the antenna routing element is further configured to determine signal strength of the received signals.

13. The array antenna of claim 1 wherein the antenna routing element is further configured to provide encryption and decryption capabilities for use in connection with the transmitted and received signals.

14. A fixed radio unit having an array antenna, the array antenna comprising:

a plurality of antenna panels each configured to transmit and receive signals;

one or more array control elements, each array control element configured to couple to one or more antenna panels and further configured to process the transmitted and received signals; and an antenna routing element configured to:

communicate with the one or more array control elements;

route packets generated based on the received signals and to forward packets that are destined for transmission, and issue a "disconnect" message when the array antenna is powered down.

15. The array antenna of claim 14 wherein the plurality of antenna panels are arranged in a hexagonal configuration.

16. The array antenna of claim 14 wherein at least one of the one or more array control elements is further configured to couple via a switch to any one of the plurality of antenna panels.

17. The array antenna of claim 14 wherein two or more of the plurality of antenna panels are capable of becoming active for transmitting respective signals.

18. The array antenna of claim 14 wherein at least one of the array control element includes:

a switch coupled to an antenna panel;

a low noise amplifier coupled to the switch to receive the received signals from the antenna panel and generate an output;

an I/Q down converter configured to receive the output from the low noise amplifier and generate a first output and a second output;

a demodulator configured to receive the first and second outputs from the I/Q down converter and generate a received packet;

a modulator configured to receive a packet to be transmitted and generate a first output and a second output based on the packet to be transmitted;

an I/Q up converter configured to receive the first and second outputs from the modulator and generate an output; and a power amplifier configured to receive the output from the I/Q converter and generate an output, the power amplifier further coupled to the switch to forward its output to the antenna panel for transmission;

wherein the switch is controlled by logic to couple the antenna panel to either the low noise amplifier or the power amplifier depending on whether signals are to be received or transmitted.

19. The array antenna of claim 18 wherein the antenna routing element is further configured to generate and forward the packet to be transmitted to the one or more array control elements for transmission;

wherein the antenna routing element further includes a routing table having routing information; and wherein the antenna routing element is further configured to receive the received packet from the at least one of the array control elements and forward the received packet based on routing information in the routing table.

20. The array antenna of claim 18 wherein the received packet includes header and payload information; and wherein the header information includes information relating to a quality of service for the received packet.

21. An integrated circuit having the one or more array control elements and the antenna routing element as recited in claim 14.

22. The array antenna of claim 14 wherein the antenna routing element is further configured to check the validity of the packets generated based on the received signals before such packets are routed further.

23. The array antenna of claim 14 wherein the one or more array control elements are assigned respective transmission priorities; and wherein the antenna routing element is further configured to forward the packets destined for transmission to the one or more array control elements depending on a quality of service criterion associated with each packet.

24. The array antenna of claim 14 wherein the antenna routing element is further configured to determine signal quality of the received signals.

25. The array antenna of claim 14 wherein the antenna routing element is further configured to determine signal strength of the received signals.

26. The array antenna of claim 14 wherein the antenna routing element is further configured to provide encryption and decryption capabilities for use in connection with the transmitted and received signals.

27. An array antenna comprising:
a plurality of antenna panels each configured to transmit and receive signals;
an array control element configured to couple via a switch to one or more of the plurality of antenna panels and further configured to process the transmitted and received signals; and
an antenna routing element configured to:
communicate with the array control element:
route packets generated based on the received signals and forward packets that are destined for transmission; and
issue a "disconnect" message when the array antenna is powered down.

28. The array antenna of claim 27 wherein the plurality of antenna panels are arranged in a hexagonal configuration.

29. A fixed radio unit incorporating the array antenna as recited in claim 27.

30. The array antenna of claim 27 wherein two or more of the plurality of antenna panels are capable of becoming active for transmitting respective signals.

31. The array antenna of claim 27 wherein the array control element includes:
a switch coupled to one of the plurality of antenna panels;
a low noise amplifier coupled to the switch to receive the received signals from one of the plurality of antenna panels and generate an output;
an I/Q down converter configured to receive the output from the low noise amplifier and generate a first output and a second output;
a demodulator configured to receive the first and second outputs from the I/Q down converter and generate a received packet;
a modulator configured to receive a packet to be transmitted and generate a first output and a second output based on the packet to be transmitted;
an I/Q up converter configured to receive the first and second outputs from the modulator and generate an output; and
a power amplifier configured to receive the output from the I/Q converter and generate an output, the power amplifier further coupled to the switch to forward its output to one of the plurality of antenna panels for transmission;
wherein the switch is controlled by logic to couple one of the plurality of antenna panels to either the low noise amplifier or the power amplifier depending on whether signals are to be received or transmitted.

32. The array antenna of claim 31 wherein the antenna routing element is further configured to generate and forward the packet to be transmitted to the array control element for transmission;

wherein the antenna routing element further includes a routing table having routing information; and wherein the antenna routing element is further configured to receive the received packet from the array control element and forward the received packet based on routing information in the routing table.

33. The array antenna of claim 31 wherein the received packet includes header and payload information; and wherein the header information includes information relating to a quality of service for the received packet.

34. An integrated circuit having the array control element and the antenna routing element as recited in claim 27.

35. The array antenna of claim 27 wherein the antenna routing element is further configured to check the validity of the packets generated based on the received signals before such packets are routed further.

36. The array antenna of claim 27 wherein the plurality of antenna panels are assigned respective transmission priorities;

wherein the antenna routing element is further configured to forward the packets destined for transmission to the array control element; and wherein the array control element is further configured to forward the packets destined for transmission to the plurality of antenna panels depending on a quality of service criterion associated with each packet.

37. The array antenna of claim 27 wherein the antenna routing element is further configured to determine signal quality of the received signals.

38. The array antenna of claim 27 wherein the antenna routing element is further configured to determine signal strength of the received signals.

39. The array antenna of claim 27 wherein the antenna routing element is further configured to provide encryption and decryption capabilities for use in connection with the transmitted and received signals.

* * * * *